United States Patent Office 3,033,872
Patented May 8, 1962

3,033,872
METHOD OF MAKING A SUBSTITUTED PREGNADIENE-DIONE
Robert Joly, Montmorency, and Daniel Bertin, Montrouge, France, assignors, by mesne assignments, to Roussel-UCLAF, S.A., Paris, France, a corporation of France
No Drawing. Filed July 2, 1956, Ser. No. 595,097
Claims priority, application France July 29, 1955
4 Claims. (Cl. 260—397.45)

This invention relates to a method of making a substituted pregnadiene-dione.

More particularly this invention relates to a method of making $\Delta^1$-dehydrocortisol (prednisolone), having the formula:

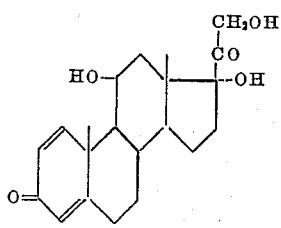

In their copending application Serial No. 577,208 of April 10, 1956, now Patent No. 2,888,472, entitled "Method of Preparing Pregnadiene Substitutes and Intermediate Product," the applicants have described a method of making 2,4-dibromo 17α-hydroxy 21-acetoxy pregnane 3,11,20-trione and the method of transforming this compound into $\Delta^1$-dehydrocortisone or prednisone. This process comprises brominating, in the medium of dioxane, 4-bromo 17α-hydroxy 21-acetoxy pregnane 3,11,20-trione which results in the desired dibrominated derivative, whose double dibromohydration is effected by methods well known in the prior art. For example HOLYSZ, J. Am. Chem. Soc." volume 75, page 4432 (1953), supplies $\Delta^1$-dehydrocortisone.

It has now been found that it is possible to produce $\Delta^1$-dehydrocortisol whose formula is above indicated by causing the bromine, in the medium of dioxane, to react with 11β,17α-dihydroxy 21-acetoxy pregnane, 3,20-dione,

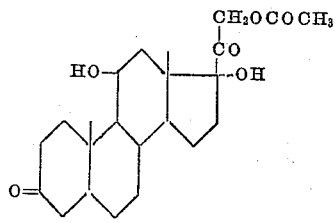

to the preparation of which this invention also relates. Thus, 2,4-dibromo 11β,17α-dihydroxy 21-acetoxy pregnane 3,20-dione,

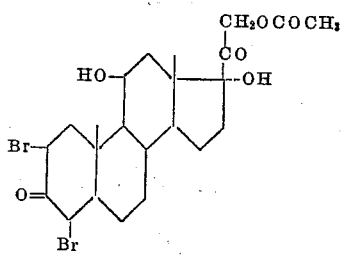

is produced, the double debromohydration of which leads to the desired $\Delta^1$-dehydrocortisol in the form of its 21-acetate which can then be saponified.

With the above in view, it is an object of the invention to provide a novel method of preparing a substituted pregnadiene-dione for use in medicine and chemistry.

Still another object of this invention is to provide a novel method of making $\Delta^1$-dehydrocortisol (prednisolone.)

Other objects and features of the invention will become apparent from the following detailed description.

The process according to the invention herein initially uses 17α-hydroxy 21-acetoxy pregnane 3,11,20-trione having the formula:

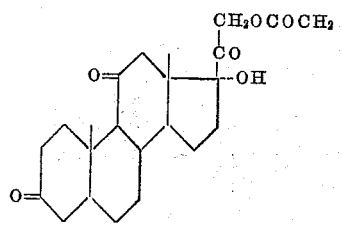

This product is an intermediate compound obtained by the synthesis of cortisone according to Gallagher as described in J. Am. Chem. Soc., 1952, 74, 483.

By causing the reaction of an excess of about 5 molecules of semicarbazide hydrochloride in the medium of acetic acid in the presence of disodium phosphate without exceeding 50°, 17α-hydroxy 21-acetoxy pregnane 3,11,20-trione is converted into its 3,20-disemicarbazone having the formula:

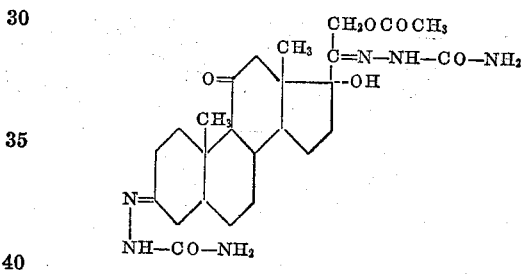

This disemicarbazone is reduced, while the acetyl at position 21 is simultaneously eliminated by means of a mixed hydride, such as the borohydride of sodium, potassium or lithium, to 3,20-disemicarbazone of 11β,17α,21-trihydroxy pregnane 3,20-dione, having the formula:

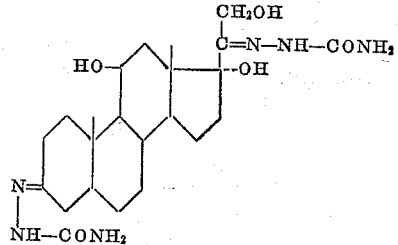

which is reacetylated at position 21 to produce 3,20-disemicarbazone of 11α,17α-dihydroxy 21-acetoxy pregnane 3,20-dione, which is hydrolyzed by hydrochloric acid-containing acetone in order to obtain:

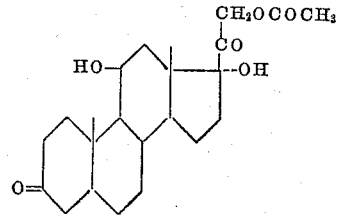

By dibrominating compound 11β,17α-dihydroxy 21-acetoxy pregnane 3,20-dione in the medium of dioxane, 2,4- dibromo, 11β,17α-dihydroxy 21-acetoxy pregnane 3,20-dione, having the formula:

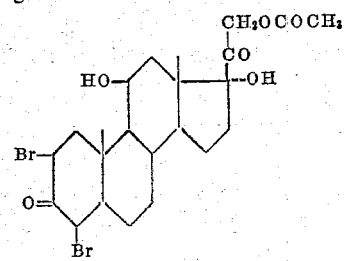

is obtained which is dehydrobrominated by the usual methods known in the prior art. The chromatography of the dehydrobrominated product produces the Δ¹-dehydrocortisol acetate

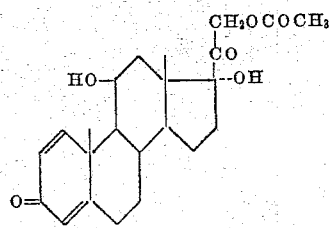

which may be saponified in Δ¹-dehydrocortisol.

The series of reactions described above are indicated as follows:

The examples given below serve to illustrate the invention without, however, limiting its scope. It is to be noted that the melting points given are instaneous melting points determined on the Maquenne block. Temperature readings are in terms of centigrade.

*Example 1.—The Preparation of 3,20-Disemicarbazone 17α-Hydroxy 21-Acetoxy Pregnane 3,11,20-Trione, Formula II Above*

325 cm.³ of acetic acid with 1% water, 50 grams of 17α-hydroxy 21-acetoxy pregnane 3,11,20-trione, and 60 grams of semicarbazide hydrochloride are introduced into a flask with three tubules, provided with an agitator, a thermometer and a tube for introducing nitrogen. The solution is next heated to 35°; and 120 grams of dry disodium phosphate are then added rapidly with constant stirring. The resultant mixture is heated to 45° for six hours with continuous stirring. The solution is then poured into ice water and neutralized while being cooled by being stirred with about 500 cm.³ of 22° Bé ammonia until the pH is 8. The resultant crude disemicarbazone is left to stand for about 30 minutes, is centrifuged and washed with water. After drying there will be about 60 grams, or a yield of 100%, of crude disemicarbazone which may be used directly for the reduction. The product retains about 10% water, having the characteristic $[\alpha]_D^{20} = +45$ to $+50°$ ($c=1\%$, dimethylformamide with 10% water).

In order to purify the product, it is washed in hot

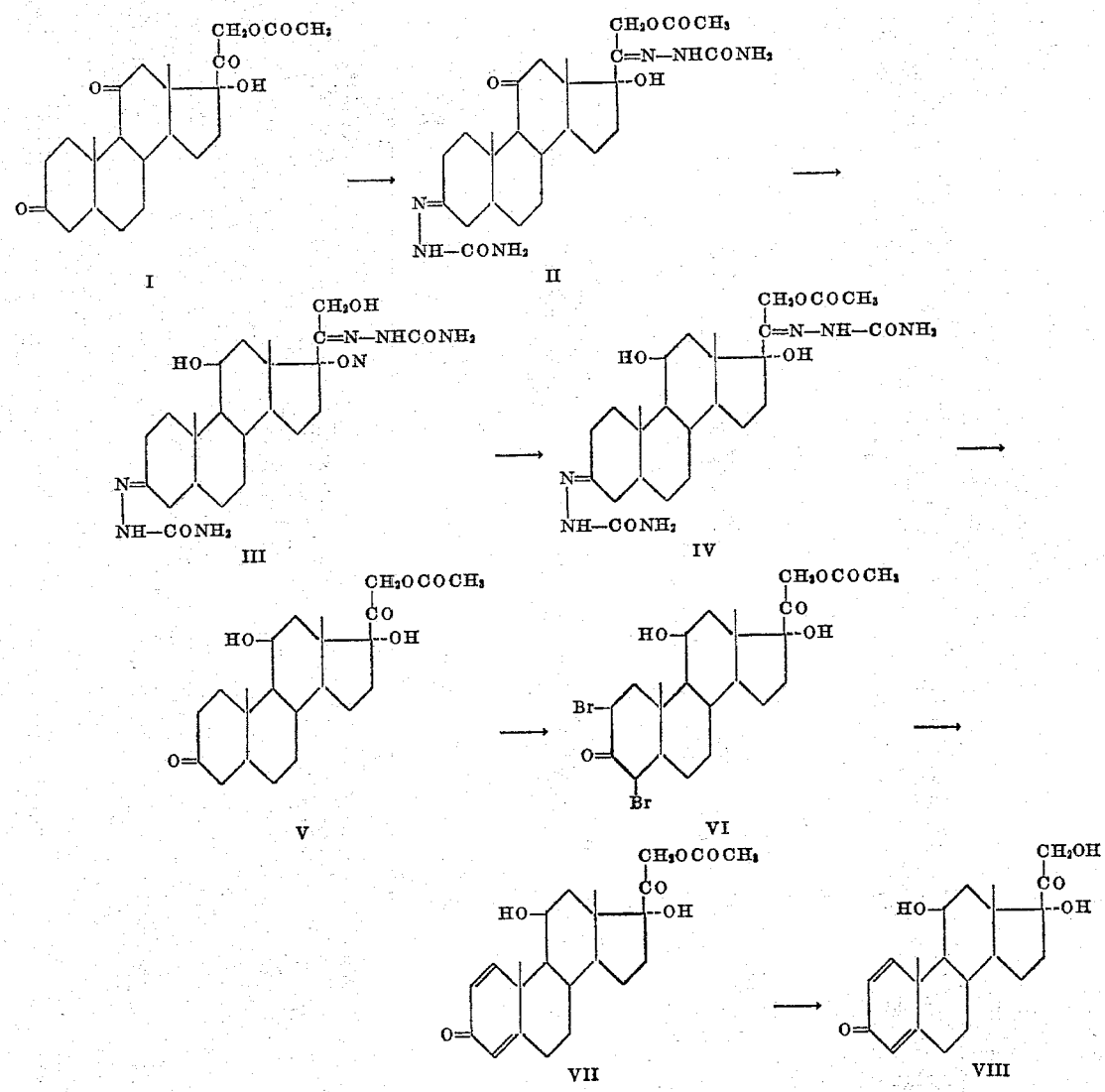

isopropyl ether, then cooled, centrifuged and dried. It is then washed while cold in 5 volumes of acetone, then in isopropyl ether, dried, dissolved in 3.5 volumes of methanol treated with charcoal whereupon 20 volumes of acetone are added. Having been iced the product is filtered and dried after being washed in methanol and acetone.

The pure compound in Formula II above is thus produced with a yield of 32%. It comprises 4% water. The $/\alpha/_D^{20} = +65°$ ($c=1\%$, dimethylformamide having 10% water). It is hygroscopic.

Nitrogen content: $C_{25}H_{38}O_6N_6 = 518.6$.
As calculated: N% = 16.25, and
As found: N% = 16.3.

This is a new compound.

*Example 2.—The Preparation of 3,20-Disemicarbazone of 11β,17α,21-Trihydroxy Pregnane, 3,20-Dione, Shown as III Above.*

While stirring and under a nitrogen current, 50 grams of crude disemicarbazone II above are introduced into 500 cm.³ of tetrahydrofuran. On the other hand, 8.3 cm.³ of potassium hydroxide solution (72 grams for 100 cm.³) are added to 500 cm.³ of water while chilling to +5° under nitrogen current. 15 grams of borohydride of potassium are introduced into this solution, and the whole is poured into the solution of compound II in tetrahydrofuran, also chilled to +5° while the stirring is being continued. The temperature rises spontaneously to about 12°. The solution is then heated to 40–45° for five hours, cooled to below 10° and is neutralized by slowly adding 50% acetic acid. The tetrahydrofuran is distilled in a vacuum and diluted by 10 volumes of water and ice, and the crude compound III which is precipitated is then centrifuged. After drying there will result 36 grams, calculated on the dry product, or a yield of 87%, of the compound III which may be directly acetylated.

The product contains 4.45% of water and has the characteristic $/\alpha/_D^{20} = +50°$ to $+60°$ ($c=1\%$, dimethylformamide having 10% of water).

In order to purify the product, it is recrystallized in about 6 volumes of absolute alcohol and chilled. After the product has been centrifuged, washed and dried, there is obtained a 30% yield of pure compound, III. The product is hygroscopic and contains 8% water. $/\alpha/_D^{20} = +65°$ ($c=1\%$, dimethylformamide having 10% water).

Nitrogen content: $C_{23}H_{38}O_5N_6 = 478.58$
As calculated: N% = 17.55
As found: N% = 17.4

This is a new compound.

*Example 3.—Preparation of 3,20-Disemicarbazone of 11β,17α-Dihydroxy 21-Acetoxy Pregnane 3,20-Dione Shown as Formula IV*

20 grams of the crude compound, III above as produced according to example 2, are dissolved at 40°, while being stirred in 40 cm.³ of pyridine. 20 cm.³ of acetic anhydride are then added, and the solution is kept at 40° for one hour. It is then poured into 600 cm.³ of an ice-and-water mixture and allowed to stand for two hours. The resultant product, formula IV is centrifuged and water until the wash water has become neutral, and is then dried in the oven. There results 17.5 grams of the compound IV calculated on the dry product which corresponds to a yield of 84%. The crude product may be used as is for the next reaction in Example 4. It contains 3.4% of water and has the characteristic $/\alpha/_D^{20} = +50°$ to $+62°$ ($c=1\%$, dimethylformamide having 10% water).

In order to purify the product for analysis, it is dissolved in 5 volumes of dry alcohol filtered and then precipitated by adding 20 volumes of acetone. After centrifuging and drying, the pure compound shown in Formula IV above is obtained which contains 4.3% water. Also it has the optical characteristic $/\alpha/_D^{20} = +77°$ ($c=1\%$, dimethylformamide having 10% water). The product is hygroscopic.

Nitrogen content: $C_{25}H_{40}O_6N_6 = 520.62$, and
As calculated: N% = 16.15
As found: N% = 15.9.

This is a new product.

*Example 4.—Preparation of 11β,17α-Dihydroxy 21-Acetoxy Pregnane 3,20-Dione, Formula V Above*

10 grams of the crude compound, Formula IV, produced according to Example 3 above, are mixed, while being mechanically stirred, with 100 cm.³ of acetone having 50% water and 60 cm.³ of concentrated hydrochloric acid. The stirring is continued, under nitrogen current, for one hour while the temperature is maintained between 30 and 35°. After the first ten minutes, the product dissolves then reprecipitates. At the end of one hour the solution is chilled to $-10°$, and then centrifuged. It is washed twice in 50% acetone, then in water until neutral. After drying there will be 3.25 grams, or a yield of 40%, of the product Formula V with a M.P. = 199 and 218°, $/\alpha/_D^{20} = +86° \pm 2$ ($c=1\%$, acetone). This compound is then used for the following reaction.

Purification by recrystallization in isopropanol produces the pure compound Formula V having the following characteristics.

M.P. = 199°, then 218°, $/\alpha/_D^{20} = +85 \pm 1.5$ ($c=1\%$, acetone).

*Example 5.—Preparation of 2,4-Dibromo 11β,17α-Dihydroxy 21-Acetoxy Pregnane 3,20-Dione Formula VI Above Indicated*

3 grams of product Formula V herein produced according to the preceding Example 4, are dissolved in 45 cm.³ of dioxane. A slight stream of nitrogen is passed into the mixture to agitate the same, and while stirring, 0.3 cm.³ of an anhydrous hydrobromic acid solution (containing 0.956 mol of hydrobromic acid per liter) are added. Then, at about 20° C., 35.5 cc. of a bromine solution in acetic acid containing 7.7 g. of bromide in 100 cc. are added within a few minutes. The solution is poured into a water and ice mixture comprising 2.4 grams of crystallized sodium acetate. The product is then centrifuged and washed on a filter in water until the wash water is free from bromide, after which the product is then vacuum dried. This produces 4.1 grams of crude compound of Formula VI, corresponding to a yield of 98.5%. The product titrates 27% of bromine, which theoretically is 28.3% and comprises about 1.5% water.

The product is purified by being formed into a paste first with 50% acetic acid and then with pure acetic acid, whereupon it is dissolved in 10 volumes of acetone. It is then filtered and 10 volumes of water are added. Compound VI crystallizes in flakes or spangles. It is centrifuged, washed in water and dried. Purification results in a yield of 20%, having a M.P. decomposing at 195–200°. The optical characteristics: $/\alpha/_D^{20} = 0° \pm 2$ ($c=0.5\%$, acetone).

Analysis shows: $C_{23}H_{32}O_6Br_2 = 564.33$, and
As calculated: C%, 48.9; H%, 5.7; Br%, 28.3
As found: C%, 48.7; H%, 6.0; Br%, 28.3.

According to the results obtained by infra-red spectrography, Compound VI is a 2α,4β-dibrominated derivative which is a new product.

*Example 6.—Preparation of 11β,17α-Dihydroxy 21-Acetoxy Δ$^{1,4}$-Pregnadiene 3,20-Dione, VII (Δ$^1$-Dehydrocortisol Acetate, Prednisolone Acetate)*

3.6 grams of Compound VI, produced according to Example 5 above are treated according to the HOLYSZ method, J. Am. Chem. Soc., 1953, 75, 4432, with 1.5 grams of lithium chloride dissolved into 40 cm.³ of dimethylformamide. It is brought to boiling for about five minutes, then is cooled rapidly and poured into diluted acetic acid. It is centrifuged, washed in water until neutral, and vacuum dried at normal temperature. The yield is at the rate of 70%. By chromatography, the acetate 21 of $\Delta^1$-dehydrocortisol, identical to the compound described in literature, is isolated. It supplies prednisolone or $\Delta^1$-dehydrocortisol, Formula VIII, by saponification.

From the foregoing, it will be noted that we have provided by a series of chemical reactions, new products and derivatives thereof.

While a preferred method has been disclosed it is to be understood that changes as to steps, use of materials may be made without departing from the spirit and scope of the invention as claimed herein.

We claim:

1. In the process of producing 11β,17α-dihydroxy-21-acetoxy-$\Delta^{1,4}$-pregnadiene-3,20-dione, the steps which comprise heating 17α-hydroxy-21-acetoxy pregnane-3,11,20-trione at a temperature not exceeding about 50° C. in acetic acid solution with an excess of semicarbazide hydrochloride in the presence of disodium phosphate, reducing the 11-keto group of the resulting 3,20-disemicarbazone by means of a mixed hydride selected from the group consisting of an alkali metal boron hydride and aluminum lithium hydride to the 11β-hydroxyl group, thereby causing saponification of the 21-acetoxy group to the 21-hydroxyl group, reacetylating the 21-hydroxyl group to produce the 3,20-disemicarbazone of 11β,17α-dihydroxy-21-acetoxy pregnane-3,20-dione, hydrolyzing said 3,20-disemicarbazone by means of acetone and hydrochloric acid to yield 11β,17α-dihydroxy-21-acetoxy pregnane-3,20-dione, reacting said compound in dioxane solution with a bromine solution in acetic acid in the presence of hydrobromic acid to yield 2α,4β-dibromo-11β,17α-dihydroxy-21-acetoxy pregnane-3,20-dione, and dehydrobrominating said 2α,4β-dibromo compound to 11β,17α-dihydroxy-21-acetoxy-$\Delta^{1,4}$-pregnadiene-3,20-dione.

2. The process according to claim 1 wherein there is an acetylating action at position 21 of the disemicarbazone of 11β,17α,21-trihydroxy pregnane, 3,20-dione by the action of acetic anhydride in the presence of pyridine.

3. The process of making $\Delta^1$-dehydrocortisol acetate comprising dibrominating 11β,17α-dihydroxy-21-acetoxy-3,20-diketo pregnane in the presence of dioxane and effecting double dehydrobromination in α-positions of the resulting 2α,4β-dibromo-11β,17α-dihydroxy-21-acetoxy-3,20-diketo pregnane, the 11β,17α-dihydroxy-21-acetoxy-3,20-diketo pregnane being used as starting material in said process.

4. The improvement in the process of making $\Delta^1$-dehydrocortisol acetate from starting materials of the pregnane series, said improvement consisting in using 11β,17α-dihydroxy-21-acetoxy-3,20-diketo pregnane as starting material, dibrominating said 11β,17α-dihydroxy-21-acetoxy-3,20-diketo pregnane by the action of bromine in acetic acid in the presence of dioxane, and of hydrobromic acid, and dehydrobrominating the resulting 2α,4β-dibromo-11β,17α-dihydroxy-21-acetoxy-3,20-diketo pregnane by heating to boiling with lithium chloride in dimethyl formamide for a few minutes to cause splitting off of two hydrogen bromide molecules and formation of $\Delta^1$-dehydrocortisol-21-acetate.

References Cited in the file of this patent

UNITED STATES PATENTS

| | | |
|---|---|---|
| 2,628,966 | Graber | Feb. 17, 1953 |
| 2,656,369 | Graber et al. | Oct. 20, 1953 |
| 2,703,805 | Rosenkranz | Mar. 8, 1955 |
| 2,735,855 | Djerassi | Feb. 21, 1956 |
| 2,736,734 | Sarett | Feb. 28, 1956 |
| 2,767,199 | Djerassi | Oct. 16, 1956 |
| 2,768,189 | Nomine | Oct. 23, 1956 |
| 2,849,463 | Joly et al. | Aug. 26, 1958 |
| 2,854,465 | Wettstein et al. | Sept. 30, 1958 |
| 2,897,216 | Oliveto et al. | July 28, 1959 |

OTHER REFERENCES

Wendler: J.A.C.S., Aug. 1951, 73, 3818–3820.
Kritchevsky et al.: J.A.C.S., vol. 74, pp. 483–486 (1952).
Herzog: J.A.C.S., 1955, 77, 4781–4784.
Jones: J. Org. Chem., May 1956, 21, 586—587.
Oliveto: J.A.C.S., 1956, 78, 1736–1738.